United States Patent [19]
Johnson

[11] 3,830,229
[45] Aug. 20, 1974

[54] DISPOSABLE BODY ELECTRODES

[76] Inventor: Joseph H. Johnson, 3611 Terminal Ct., Seattle, Wash. 98144

[22] Filed: Aug. 9, 1972

[21] Appl. No.: 279,276

[52] U.S. Cl. ......... 128/2.06 E, 128/2.1 E, 128/417, 128/DIG. 4, 206/63.2 R
[51] Int. Cl. .............................................. A61b 5/04
[58] Field of Search .......... 128/2.06 E, DIG. 4, 418, 128/417, 416, 404, 405, 410, 411, 2.1 E; 206/63.2 R; 204/196 B

[56] References Cited
UNITED STATES PATENTS

| | | | |
|---|---|---|---|
| 3,163,166 | 12/1964 | Brant et al. | 128/405 |
| 3,187,745 | 6/1965 | Baum et al. | 128/2.06 E |
| 3,380,448 | 4/1968 | Sadove et al. | 206/63.2 R |
| 3,518,984 | 7/1970 | Mason | 128/2.06 E |
| 3,701,346 | 10/1972 | Patrick et al. | 128/2.06 E |

*Primary Examiner*—Richard A. Gaudet
*Assistant Examiner*—Lee S. Cohen
*Attorney, Agent, or Firm*—Seed, Berry, Vernon & Baynham

[57] ABSTRACT

A single use cardiograph electrode has a self-contained electrolyte gel-impregnated pad therein set in a cup and sealed with a cap which forms an integral mechanical and frictional seal with the cup to prevent electrolyte dry-out.

4 Claims, 3 Drawing Figures

PATENTED AUG 20 1974　　　　　　　　　　　　　　3,830,229

DISPOSABLE BODY ELECTRODES

BACKGROUND OF THE INVENTION

1. Field of the Invention

This invention relates to a disposable body electrode having a self-contained electrolyte gel therein.

2. Prior Art Relating to the Disclosure

Disposable body electrodes for diagnostic purposes having a self-contained gel or electrolyte paste have been widely used. The problem associated with these electrodes is dry-out or evaporation of the gel prior to use of the electrodes. This is particularly the case when the gel is contained within the body of the electrode by a strippable membrane such as disclosed in U.S. Pat. Nos. 3,515,619; 3,170,459; 3,487,821; 3,590,810; 3,518,984; and 3,602,216. Hermetic sealing of the electrodes in foil packaging which is illustrated by U.S. Pat. No. 3,602,216 has been used to alleviate this problem.

SUMMARY OF THE INVENTION

This invention relates to a disposable body electrode having a self-contained electrolyte gel therein comprising: (1) a flexible, non-conductive member having an adhesive-coated surface to contact the skin surface; (2) a cup-shaped element including a cavity therein secured to the non-conductive member so that the opening of the cavity is towards the skin contacting area and the rim of the cup contacts the skin surface, the cavity designed to hold an electrolyte gel impregnated pad; (3) an electrically conductive connector disposed in the cup-shaped element; and (4) a cap over the cup-shaped element isolating the electrolyte gel from the atmosphere and preventing dry-out thereof, the cap and the cup-shaped element having means forming an integral mechanical and frictional seal therebetween.

The objects of this invention are to provide a disposable body electrode having a self-contained electrolyte gel wherein a mating cup and cap form an integral mechanical and frictional seal therebetween to prevent dry-out of the gel; to provide a disposable body electrode having a cap over a gel-impregnated pad which does not require an adhesive to hold it in place; to provide a disposable body electrode having a cup-shaped element holding a gel impregnated pad over which is disposed a replaceable cap sealing the gel-impregnated pad against contact with the atmosphere and holding the pad in place until use of the electrode.

DESCRIPTION OF THE PREFERRED EMBODIMENTS

Figure 1:
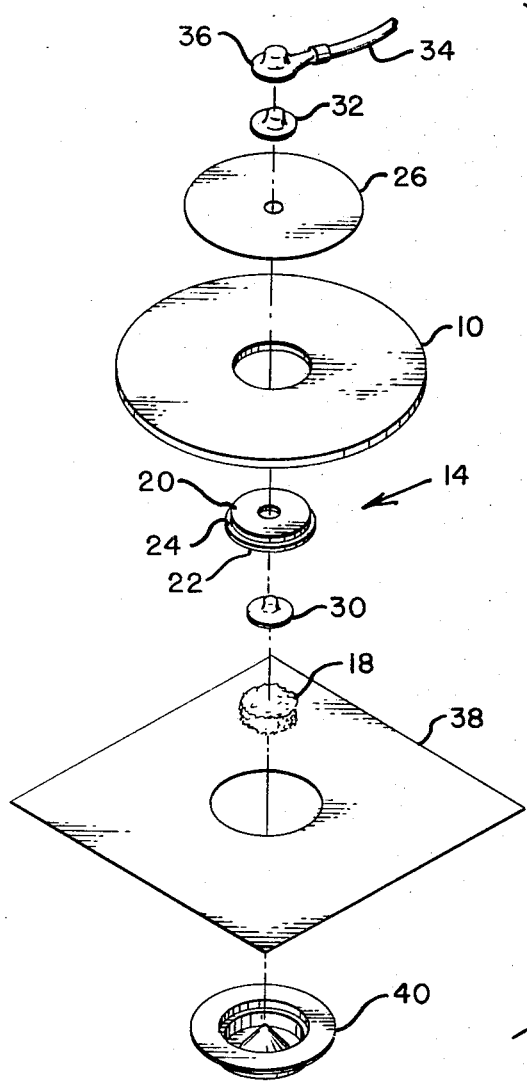
FIG. 1 is an exploded view of the components of the body electrode assembly of this invention.

Referring to FIG. 1 for an exploded view of the components of the electrode assembly, a centrally apertured, flexible foam plastic disc 10 having a pressure sensitive skin adhesive 12 coated on the underside thereof functions to hold the remainder of the electrode assembly against the skin of the patient.

A circular cup-shaped element 14 having an outer diameter essentially the same as the diameter of the central aperture of disc 10 has an internal cavity 16 for holding an electrolyte gel or electrolyte gel-impregnated pad. The cup-shaped element is positioned in the aperture of the disc 10 so that the opening thereof is toward the skin contacting area of the electrode. The cup-shaped element has a substantially flat outer surface 20 and vertically extending side walls terminating in a rim 22. Above the rim is an outwardly directed rib 24 extending completely around the circumference of the cup-shaped element. The rib holds the cap in place and, in cooperation with the cap to be described later, aids in effecting sealing of the self-contained electrolyte or electrolyte gel-impregnated pad within the cup. The rim 22 of the cup extends downwardly beyond the plane of the disc 10 for effective continuous contact with the skin of the patient. The cup 14 is held in place in the aperture of the disc 10 by an adhesive coated sheet plastic disc 26 covering the outer surface 20 of the cup 14 and a portion of the upper surface of disc 10 as illustrated in FIG. 2.

An electrical conductor, suitably a male "snap" connector of conventional variety, has an inner electrically conductive disc 30 disposed in the base of the cup 14 which forms an electric connection with an outer electrically conductive disc 32. The insulated wire 34 having a female snap connector 36 on one end thereof secured the electrode to the desired diagnostic instrument, whether a cardiograph or other suitable instrument.

Figure 2:
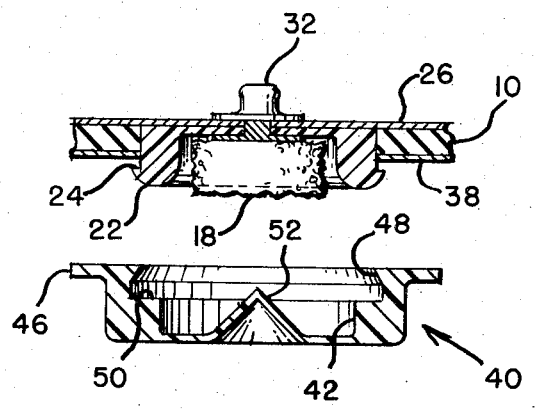
FIG. 2 is a vertical cross-sectional view of the electrode assembly illustrating the integral seal formed between the sealing cap and cup-shaped member.
Figure 3:
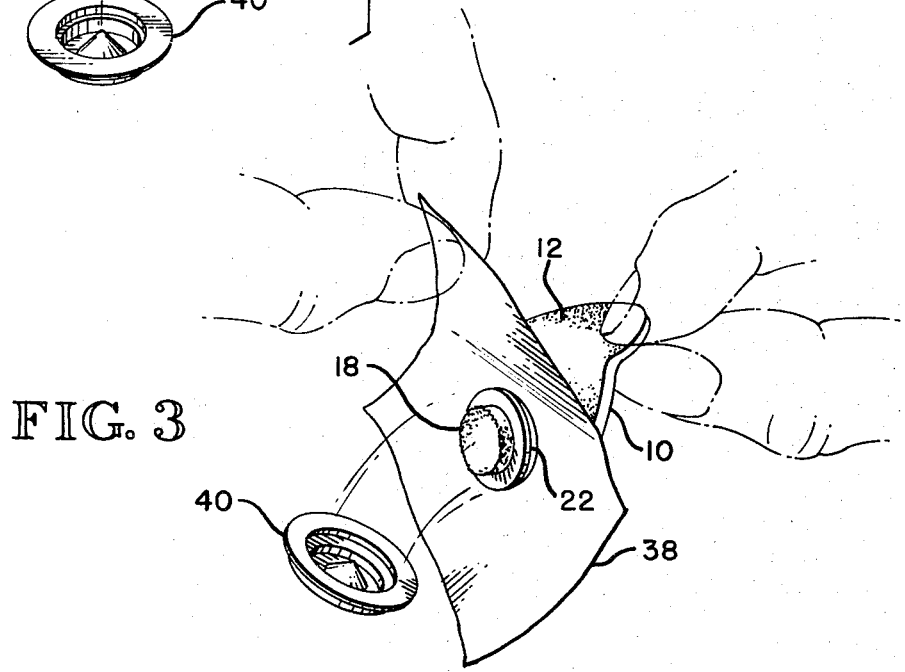
FIG. 3 is a perspective view illustrating the manner in which peel-off of the strippable backing pops the cap loose so that the electrode is immediately available for use.

A plastic foam pad 18 of polyethylene or other suitable plastic foam thoroughly impregnated with a suitable conductive electrolyte gel is disposed in the cavity of cup 14 as illustrated by FIG. 2. The pad is of a thickness to project slightly beyond the plane of the rim 22 of the cup 14. When the electrode assembly is affixed to the skin of the patient, the pad is slightly compressed against the skin surface forming effective and continuous electrical contact therewith.

A peel-off paper 38 having a central aperture of a diameter substantially the same as the outer diameter of cup 14 is applied to the adhesive coating of the disc 10 to protect the adhesive until the electrode is ready for use. The paper preferably extends beyond the peripheral edges of the disc 10 so that it can be readily pulled off when the electrode is ready to use.

A cap 40 is fitted over the cup 14 forming a mechanical and frictional seal therewith to hold the gel-impregnated pad 18 in place and prevent exposure of the pad to the atmosphere, thus keeping the gel moist and preventing dry-out. The integral mechanical and frictional seal between the cap and cup allows removal and replacement of the cup without resulting dry-out of the electrolyte gel-impregnated pad. Referring to FIG. 2, the cap 40 is essentially hat-shaped in cross-section and has a base and vertical side walls 42 terminating in a rim or flange 46. A portion of the flange 48 extends inwardly around the circumference of the cap. The side wall also has a shoulder portion 50 which contacts the rim 22 of the cup when the cap is snapped into place to form a sealing surface. The flange 48 grips the side walls of the cup 14 to form a primary frictional seal and in addition cooperatively mates with rib 24 of the cup to form a mechanical seal therebetween.

An inwardly directed dimple 52 formed in the base of the cap contacts the gel-impregnated pad and holds it in place until the electrode is ready for use. The rim or flange of the cap 46, when snapped into place over the cup, overlaps the peel-off paper 38 so that peeling off the paper pops the cap loose from the cup, allowing immediate service of the electrode. If desired, portions of the flange 46 may be adhesively adhered to the paper 38 so that they pop off as a unit.

The electrode assembly of this invention is inexpensively and easily manufactured, reliable and does not require hermetic packaging to prevent dry-out of the self-contained electrolyte gel. The electrode is assembled by die cutting a strip of foam pad plus liner paper with a two-level die which cuts through the foam and liner paper to form a central aperture therein but only cuts through the foam pad to form a circular disc. The cup is then placed in the aperture of the disc 10 and the disc and cup adhesively bonded together with the adhesive coated plastic sheet 26. The inner and outer portions of the snap electrical connector are then pressed into place, the gel impregnated pad inserted and the cap 40 snapped into place over the cup 14.

The embodiments of the invention in which a particular property or privilege is claimed are defined as follows:

1. A disposable, skin-contacting body electrode having a self-contained electrolyte gel therein, comprising:

a relatively thin, flexible, non-conductive sheet material having an aperture therein and an adhesive layer thereon for contact with the skin of a subject, a cup-shaped member, including a cavity therein, disposed in the aperture so that the opening of the cavity is toward the skin-contacting area and the rim of the cup contacts the skin surface, a securing member bonded to the base of the cup-shaped member and the non-adhesive-coated surface of the non-conductive sheet material holding the cup-shaped member in the aperture thereof, a male snap connector having an inner conductive disc disposed in the base of the cavity of the cup-shaped member interconnecting with an outer conductive disc disposed over the securing member having means thereon for connecting a lead wire thereto, a strippable sheet covering only the adhesive-coated surface of the non-conductive sheet material, an electrolyte gel-impregnated pad disposed in the cavity of the cup-shaped member in contact with the inner conductive disc and extending beyond the rim of the cup-shaped member into contact with the skin surface when the electrode is applied to the skin, and a cap member over the pad and cup-shaped member including an inwardly extending flange around the inner circumference of the cap member which grips the side walls of the cup-shaped member to form an integral, frictional seal therebetween.

2. The body electrode of claim 1 wherein the cup-shaped member includes a rib extending around its outer circumference which mates with the flange of the cap member, the rib forming a mechanical seal with the flange of the cap member and aiding to retain the cap member over the cup-shaped member.

3. The body electrode of claim 1 wherein the cap member is hat-shaped in cross-section and wherein the inwardly extending flange is around the inner circumference of the side walls and wherein a projection extends downwardly from the base thereof, contacting the gel pad to retain it in position.

4. The body electrode of claim 1 wherein the cap member includes a rim portion overlapping the strippable sheet so that when the sheet is peeled off the non-conductive sheet material, the cap member is also removed from the cup-shaped member.

* * * * *